Patented Nov. 24, 1925.

1,563,205

UNITED STATES PATENT OFFICE.

LEON LILIENFELD, OF VIENNA, AUSTRIA.

INSULATING GOODS AND PROCESS OF PRODUCING SAME.

No Drawing. Application filed May 31, 1921. Serial No. 473,833.

*To all whom it may concern:*

Be it known that I, Dr. LEON LILIENFELD, of Podhajce, Poland, a citizen of the Republic of Poland, residing at 1 Zeltgasse, Vienna VIII, Austria, have invented certain new and useful Improvements in Insulating Goods and Processes of Producing Same, of which the following is a specification.

In the ethers of cellulose or of its conversion products and derivatives, that is to say, compounds of cellulose or its conversion products or derivatives in which one or more hydroxyl-hydrogen atoms of cellulose are replaced by alkyl radicals, the inventor has discovered materials which by themselves, or in admixture with suitable substances, are adapted for the manufacture of insulating materials.

The great suitability of the ethers of cellulose for the above stated uses, is due to the following advantages:

1. Their extreme permanency or stability, and their extreme neutrality. They withstand being heated in the presence or absence of water; they are also resistant to hot alkaline solutions. This stability of the cellulose alkyl ethers and their resistance to water results in an insulating power far surpassing the insulating power of all other cellulose derivatives, such as cellulose esters which lose their insulating power under the influence of humidity owing to a slow gradual hydrolytic decomposition. For instance, the insulating power of a cellulose penta ethyl ether in the shape of a cube having the volume of a cubic centimetre amounts to about 1500x10⁶ Meg.-ohm.

2. The great suppleness and resistance to chemical and physical influences and the notable toughness and hardness of the plastic masses produced from the solutions or jellies of the ethers of cellulose.

3. Their property of dissolving easily and readily in a very great number of solvents.

4. Their relative non-inflammability, as compared with cellulose and also as compared with cellulose nitrates.

Since the number of solvents (simple and mixed) for the cellulose ethers is very large, they may be treated in combination with a very large number of softening agents and colloiding media.

The large number of solvents renders it also possible to combine the ethers of cellulose with many colloids or binding substances and plastic bodies, with which the hitherto known and used cellulose derivatives could not be combined.

I may for instance combine the alkyl derivatives of cellulose which are soluble in organic solvents with the following substances: cellulose-nitrates (nitro-celluloses), cellulose formates, cellulose acetates (acetyl-celluloses) and the like, camphor and the substitutes for camphor employed in the celluloid-industry (such as naphthalene, etc.), resins and the resinous condensation products of phenols and aldehydes, non-drying oils, oxidized and unoxidized drying oils, rubber, gutta-percha, balata, rubber substitutes, metallic resinates and oleates, waxes, paraffins, fats and the like.

The choice of suitable solvents for ethers of cellulose is much wider than for the hitherto known cellulose derivatives. Thus, for instance, some cellulose ethers, for example, some of the ethyl ethers, are soluble in alcohol, methyl-alcohol, glacial acetic acid, formic acid, pyridin, quinolin, picolin, epi-chlorhydrin or the like, nitro-benzene, ethyl-acetate, amyl-acetate, butyl-acetate, and the like, acetone, pentachlor-ethane, tetrachlor-ethane, trichlor-ethylene, acetylene dichlorid, carbon tetrachlorid, chloroform or the like, benzene, toluene, xylene, nitro-phenols, or the like, naphthalene, or the like, turpentine oil, camphor, phenyl-ethers, etc.

In order to carry out the manufacturing of the new insulating goods, water-insoluble alkyl ethers of cellulose or of its conversion products or derivatives for example an ethyl ether or benzyl ether of cellulose in which at least four hydrogen atoms of the hydroxyl-groups of the cellulose have been replaced by ethyl- or benzyl-radicals, is dissolved, either alone or in admixture with substances which by their action impart plasticity (also called colloiding agents), in a suitable solvent. This solution may be also mixed with other suitable colloids (for example rubber, gutta-percha, oils and the like) or with filling substances or the like. These substances (plasticifying agents or colloiding agents) are readily distinguished from the volatile liquids referred to above, which are used as solvents, and subsequently evaporated, in that these plasticifying or colloiding agents are non-volatile under ordinary conditions so that they remain (in substantially their original amounts) permanently admixed with the cellulose ethers and the said placticifying agents will boil (if at all) only at a high temperature, whereas the volatile solvents, of course, are permitted to evaporate during the drying of the product, being employed as volatile solvents to render the material substantially fluid during the manipulative treatment. In the appended claims I accordingly use the expression "substantially non-volatile" to clearly distinguish from readily volatile materials.

The composition thus obtained is either converted into a plastic insulating material by evaporating the solvent wholly or partially, by calendering (rolling out) drying and pressing or it is applied as a coating to wires or cables by means of suitable machinery.

If the alkyl derivatives of cellulose are used in the absence of substances imparting plasticity or if a substance imparting plasticity is incorporated which does not dissolve the alkyl ether of cellulose, a solvent is indispensable. Most of the substances imparting plasticity (that is to say, colloiding agents) being also solvents for the water insoluble cellulose alkyl ethers, the latter mixed with such substances imparting plasticity yield, when warmed, and well kneaded, compositions or pastes capable of being worked up as a plastic material into desired products or applied on wires or cables without volatile solvents or with only small quantities of solvents.

The substances imparting by their action plasticity differ from one another by their stability and insulating power. It is advisable to choose for the manufacture of the new insulating goods such substances imparting plasticity as are stable and distinguished by a good insulating power, for example, high boiling non-volatile aromatic hydrocarbon compounds, for example m-dixylylethane (which boils at about 332 to 338° C.), or benzyl cresylether, (which boils at about 285 to 290° C.).

The new insulating goods are distinguished by their high insulating power, their stability, their flexibility, and their resistance to water and alkalies.

*Example.*

600 parts by weight of a water-insoluble cellulose ethyl ether or cellulose benzyl ether (for example, cellulose penta ethyl ether) are mixed with 400 parts by weight of benzyl cresylether or of a high boiling aromatic hydrocarbon (such as m-dixylylethane) and dissolved in 1800 parts of toluene or benzene and 200 parts of ethyl alcohol and kneaded in a vacuum kneading machine for about 2 hours at a temperature of 60–80° C. Subsequently about half of the volatile solvents is evaporated and the mass is (a) either calendered (rolled out), dried, heated, and pressed, or (b) applied to wires or cables by means of suitable machinery and if necessary dried.

In the former case a laminiform insulating material, in the latter a wire or cable covered with a flexible insulating sheath is produced.

What I claim is:—

1. An insulating material containing as essential constituents an alkyl ether of a cellulosic body which ether is practically insoluble in water, together with a substantially non-volatile plasticifying agent which is a non-conductor of electricity, and which material does not boil at a low temperature.

2. An insulating material containing as essential constituents, an ethyl ether of a cellulosic body which ether is practically insoluble in water, together with a substantially non-volatile colloiding agent, which is also practically insoluble in water, and which substance, when mixed with said ether gives a product which is a good electrical insulator, and which colloiding agent is stable up to high temperatures.

3. An insulating material containing as its essential constituents, an ether of a cellulosic body in admixture with an electrically non-conductive substance capable of imparting plasticity, said substance being substantially non-volatile, and being stable up to high temperatures.

4. An insulating material containing as essential constituents, an ethyl ether of a cellulosic body in admixture with an electric-insulating substance which is substantially non-volatile and capable of imparting plasticity, and which is stable up to high temperatures.

5. An insulating material containing as essential constituents, an ether of a cellulosic body in admixture with a substantially non-volatile aromatic hydrocarbon capable of imparting plasticity, and having a high boiling point.

6. A composition of matter comprising an ether of a cellulosic body, together with an aromatic hydrocarbon plasticifying material which is substantially non-volatile under ordinary atmospheric conditions, and which is a non-conductor of electricity, and which has a high boiling point.

7. A composition of matter comprising an alkyl ether of a cellulosic body, together with a high-boiling aromatic hydrocarbon plasticifying material which is substantially non-volatile under ordinary atmospheric conditions, and which is a non-conductor of electricity.

8. A composition of matter comprising an ether of a cellulosic body, together with dixylylethane.

9. A composition of matter comprising an alkyl ether of a cellulosic body, together with a dixylylethane.

10. An electric insulator composition comprising a water-insoluble ethyl ether of cellulose and dixylylethane.

11. An insulating composition comprising an ether of a cellulosic body and a substantially non-volatile hydrocarbon plasticifying agent of high boiling point, which is a non-conductor of electricity, such mixture being substantially solid, somewhat flexible, but non-liquid and a non-conductor of electricity.

12. An insulating material containing as essential constituents, an ether of a cellulosic body in admixture with a normally non-volatile hydrocarbon capable of imparting plasticity, such hydrocarbon being a non-conductor of electricity, and having a high boiling point.

13. A shaped insulating composition comprising a water-insoluble ether of a cellulosic body, in which at least four of the hydroxyl groups of the cellulose are etherified, in intimate admixture with a substantially non-volatile plasticifying agent which is a non-conductor of electricity.

14. A method of making an insulator structure, which comprises adding a volatile common solvent to a cellulose ether and a substantially non-volatile electrically non-conducting substance capable of imparting plasticity, evaporating part of the volatile solvent and calendering, drying and pressing the thus obtained mass.

15. A method of making an insulating material which comprises adding volatile solvents comprising a plurality of liquids, to a cellulose ether and a substantially non-volatile electrically non-conductive substance capable of imparting plasticity, and thereafter evaporating part of the volatile solvent.

16. A method of making insulating material, which comprises adding a common solvent to a cellulose ether and a substantially non-volatile electrically non-conducting substance capable of imparting plasticity, evaporating said solvent, and forming the mass into a shaped product.

In testimony whereof I have affixed my signature.

Dr. LEON LILIENFELD.